United States Patent
Poublon et al.

[11] Patent Number: 5,945,597
[45] Date of Patent: Aug. 31, 1999

[54] METHOD FOR MONITORING CATALYTIC CONVERTER EFFICIENCY

[75] Inventors: Mark J. Poublon, Utica; Michael W. Weglarz, Macomb Township, both of Mich.

[73] Assignee: Chrysler Corpoation, Auburn Hills, Mich.

[21] Appl. No.: 08/972,836

[22] Filed: Nov. 18, 1997

Related U.S. Application Data

[63] Continuation of application No. 08/646,661, May 8, 1996.

[51] Int. Cl.$^6$ .............................. G01M 19/00; G01L 3/26
[52] U.S. Cl. ...................... 73/118.1; 73/23.31; 73/23.32; 60/277; 701/103; 701/109
[58] Field of Search .......................... 73/115, 116, 117.2, 73/117.3, 118.1, 118.2, 23.31, 23.32; 60/277; 701/103, 109

[56] References Cited

U.S. PATENT DOCUMENTS

| | | | |
|---|---|---|---|
| 4,445,326 | 5/1984 | Lyon | 73/117.3 |
| 4,691,562 | 9/1987 | Abthoff et al. | 73/118.1 |
| 5,157,921 | 10/1992 | Ito et al. | 73/118.1 |
| 5,237,818 | 8/1993 | Ishii et al. | 73/118.1 |
| 5,363,091 | 11/1994 | Kotwicki et al. | 73/118.2 |
| 5,386,693 | 2/1995 | Orzel | 60/274 |
| 5,417,105 | 5/1995 | Kuroda et al. | 364/431.04 |
| 5,427,071 | 6/1995 | Thomas et al. | 123/491 |
| 5,427,082 | 6/1995 | Thomas et al. | 123/675 |
| 5,431,043 | 7/1995 | Gugel et al. | 73/117.3 |
| 5,469,826 | 11/1995 | Thomas et al. | 123/48 |
| 5,488,858 | 2/1996 | Achleitner | 73/116 |
| 5,492,102 | 2/1996 | Thomas et al. | 123/493 |
| 5,645,745 | 7/1997 | Hartwick et al. | 219/497 |

OTHER PUBLICATIONS

Co–pending and commonly assigned patent application serial No. 08/646,660, filed May 8, 1996.
Co–pending and commonly assigned patent application serial No. 08/497,592, filed Jun. 30, 1995.
SAE Technical Paper Series, Detection of Catalyst Performance Loss Using On–Board Diagnostics, William B. Clemmens, Michael A. Sabourin and Thomas Rao, Mar. 7, 1990, #900062.

*Primary Examiner*—George Dombroske
*Attorney, Agent, or Firm*—Mark P. Calcaterra

[57] ABSTRACT

A method for monitoring the efficiency of a catalytic converter in a motor vehicle includes the steps of determining if at least one predetermined condition is met for monitoring the efficiency of the catalytic converter. The method includes biasing a fuel feedback multiplier of an internal combustion engine of the motor vehicle to run rich or lean if the at least one predetermined condition is met. The method includes counting a number of switches across a predetermined switch point from an upstream oxygen sensor and a downstream oxygen sensor. The method includes calculating a switching frequency ratio based on the count of the switches from the upstream oxygen sensor and downstream oxygen sensor and using the switching frequency ratio to establish the efficiency level of the catalytic converter.

14 Claims, 5 Drawing Sheets

METHOD FOR MONITORING CATALYTIC CONVERTER EFFICIENCY this application is a continuation of pending application Ser. No. 08/646,661, titled "Method for Monitoring Catalytic Converter Efficiency" filed May 8, 1996, by the same inventors as in the present application.

BACKGROUND OF THE INVENTION

1. Field of the Invention

The present invention relates generally to catalytic converters and, more particularly, to a method for monitoring efficiency of a catalytic converter in a motor vehicle.

2. Description of the Related Art

Increasingly stringent federal and state motor vehicle emission standards include On-Board Diagnostics regulations requiring that specific emission related systems on a motor vehicle be monitored. The intent of the regulations is to ensure that these systems are functioning as intended, and if the system has deteriorated, that the vehicle operator be informed. For example, a catalytic converter of a motor vehicle is monitored because of its ability to reduce undesirable emissions present in exhaust gases from the engine of the motor vehicle.

The catalytic converter may deteriorate over time due to factors such as engine misfire, a faulty oxygen sensor, poisoning, or prolonged high temperature operation. As the catalytic converter deteriorates, it loses its capacity to store the oxygen available in the exhaust gases. This results in an oxygen sensor located downstream of the catalytic converter responding with faster, more frequent switching between a rich and lean condition.

An example of a catalyst monitoring system is described in a Society of Automotive Engineers paper, Number 900062, by Clemmens, Sabourin and Rao. This monitoring system uses a ratio of voltage threshold crossings of oxygen sensors upstream and downstream of the catalytic converter while the engine is operating in an open loop condition. As the catalytic converter deteriorates, and the downstream oxygen sensor begins to switch more frequently, the ratio of voltage threshold crossings approaches one.

One disadvantage of the above catalyst monitoring system is that it imposes an open loop square wave forcing function on the fuel air ratio, making it difficult to maintain the fuel air ratio near stoichiometric under actual driving conditions. Another disadvantage of the catalyst monitoring system is that the resolution is poor if applied to a closed loop condition, and the catalyst monitoring system may indicate that a catalytic converter is deteriorated, when in fact it is good. Consequently, there is a need in the art for monitoring a catalytic converter that does not have a significant effect on maintaining the fuel/air ratio at desired levels. There is also a need in the art for monitoring a catalytic converter that accurately measures the deterioration of the catalytic converter.

SUMMARY OF THE INVENTION

It is, therefore, one object of the present invention to provide a method for monitoring the efficiency of a catalytic converter in a motor vehicle.

It is another object of the present invention to provide a method for monitoring the efficiency of a catalytic converter that accurately identifies if a catalytic converter has deteriorated below a predetermined level.

It is yet another object of the present invention to provide a method for monitoring the efficiency of a catalytic converter while the engine is operating under closed loop conditions.

To achieve the foregoing objects, the present invention is a method for monitoring efficiency of a catalytic converter in a motor vehicle including the steps of determining if at least one predetermined condition is met for monitoring the efficiency of the catalytic converter and biasing a fuel/air ratio of an internal combustion engine of the motor vehicle to run rich or lean if the at least one predetermined condition is met. The method also includes the step of counting a number of switches of a signal across a predetermined switch point from an upstream oxygen sensor positioned upstream of the catalytic converter and counting a number of switches of a signal across the predetermined switch point from a downstream oxygen sensor positioned downstream of the catalytic converter. The method further includes the step of calculating a switching frequency ratio based on the count of switches from the upstream oxygen sensor and downstream oxygen sensor and using the switching frequency ratio to establish the efficiency level of the catalytic converter.

One advantage of the present invention is that a method is provided for monitoring the efficiency of a catalytic converter in a motor vehicle. Another advantage of the present invention is that the method of monitoring the efficiency of the catalytic converter has improved accuracy to avoid false positive or false negative results. Another advantage of the present invention is that the method of monitoring the efficiency of the catalytic converter takes place while the engine is operating in a closed loop condition.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
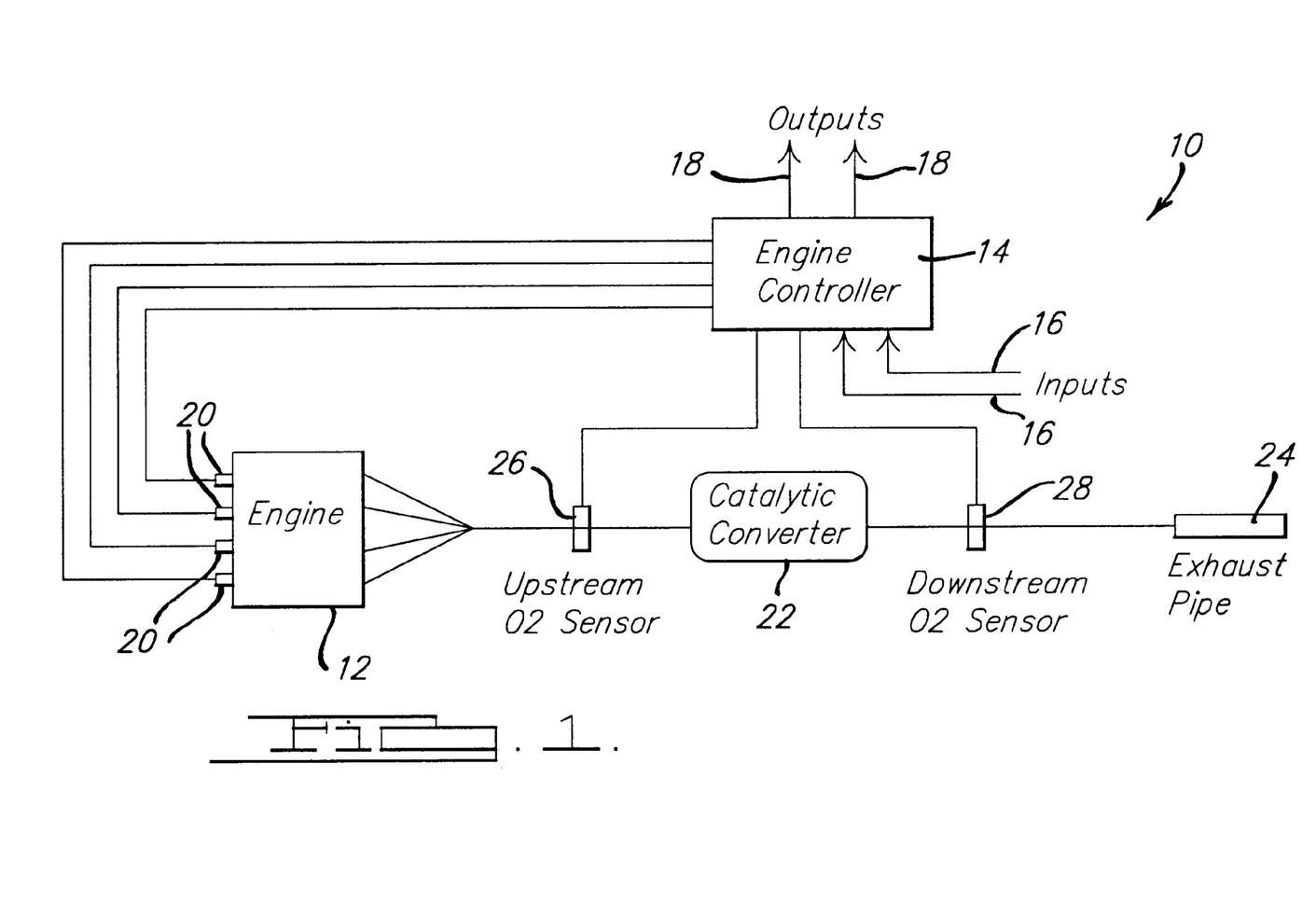
FIG. 1 is a schematic diagram of an emission control system used in conjunction with a method, according to the present invention, for monitoring efficiency of a catalytic converter of the emission control system.

Referring to FIG. 1, an emission control system 10 for a motor vehicle (not shown) is illustrated. The emission control system 10 includes an engine 12 and an engine controller 14 in communication with the engine 12. The engine controller 14 includes a microprocessing unit, memory, inputs 16, outputs 18, communication lines and other hardware and software necessary to control the engine 12 and related tasks (not shown but known in the art). It should be appreciated that the engine controller 14 may control tasks such as maintaining fuel to air ratio, spark timing, exhaust gas recirculation and on-board diagnostics.

It should also be appreciated that the emission control system 10 may also include other sensors, transducers or the like that are in communication with the engine controller 14 through the inputs 16 and outputs 18 to further carry out a method, according to the present invention, to be described.

The emission control system 10 also includes at least one, preferably a plurality of fuel injectors 20 which receive a signal from the engine controller 14 to precisely meter an amount of fuel to the engine 12. As a result of the combustion process that takes place in the engine 12, exhaust gasses are created and passed out of the engine 12. Constituents of the exhaust gas include hydrocarbons, carbon monoxide and oxides of nitrogen, which are all known to have a potential detrimental effect on air quality.

The emission control system 10 includes a catalytic converter 22 for receiving the exhaust gas from the engine 12. The catalytic converter 22 contains material which serves as a catalyst to reduce or oxidize the components of the exhaust gas into harmless gasses. The emission control system 10 includes an exhaust pipe 24 connected to the catalytic converter 22 which pass the gasses from the catalytic converter 22 into the atmosphere.

The emission control system 10 further includes an upstream oxygen sensor 26 and downstream oxygen sensor 28 which measure the level of oxygen in the exhaust gas. The upstream oxygen sensor 26 is positioned in front or upstream of the catalytic converter 22. Similarly, the downstream oxygen sensor 28 is positioned after or downstream of the catalytic converter 22. It should be appreciated that as part of the emission control system 10, the oxygen sensors 26, 28 are in communication with the engine controller 14.

Referring to FIGS. 2A through 2D, signals representative of typical feedback loop control are illustrated. For example, in FIG. 2A, a feedback multiplier signal 50 is sent by the engine controller 14 to the fuel injector 20. The multiplier signal 50 has a pulsewidth value 52 that controls the amount of fuel delivered by the fuel injector 20 by the duration of the pulsewidth. For example, if the upstream oxygen sensor 26 is indicating a lean condition, the multiplier signal 50 is increased with a kick and a ramp to increase the amount of fuel released by the fuel injector 20. Likewise, if the upstream oxygen sensor 26 is indicating a rich condition, the multiplier signal 50 is reduced, to decrease the amount of fuel.

Figure 2A:
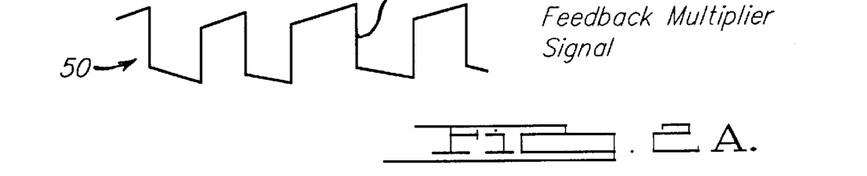
FIGS. 2A, 2B, 2C, and 2D are diagrams of signals representative of typical feedback loop control for the emission control system of FIG. 1.
Figure 2B:
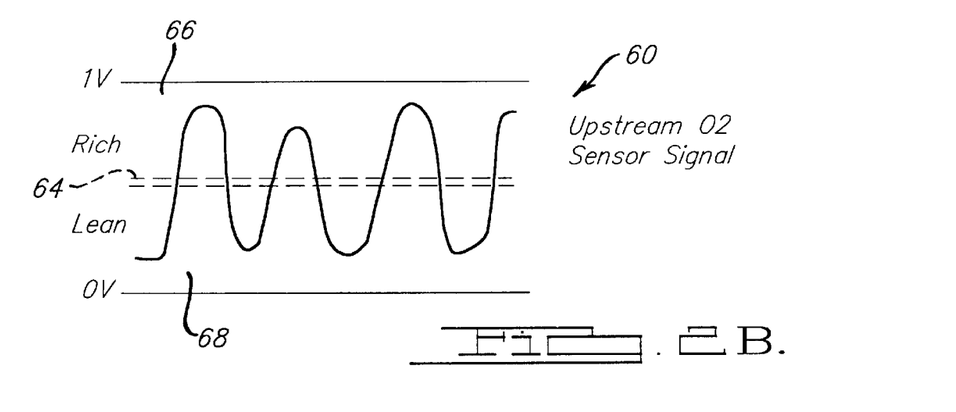

Referring to FIG. 2B, an example of an upstream oxygen sensor signal 60 from the upstream oxygen sensor 26 is shown. The oxygen sensor signal 60 is representative of a wave form, and varies between two predetermined voltages, such as zero (0) and one (1) volt in this example. A predetermined voltage threshold or switch point 64 denotes stoichiometric. It should be appreciated that the switch point 64 can represent a single voltage or a narrow band. A rich condition 66 is indicated when the oxygen sensor signal 60 is above the switch point 64 and a lean condition 68 when the oxygen sensor signal 60 is below the switch point.

Figure 2C:
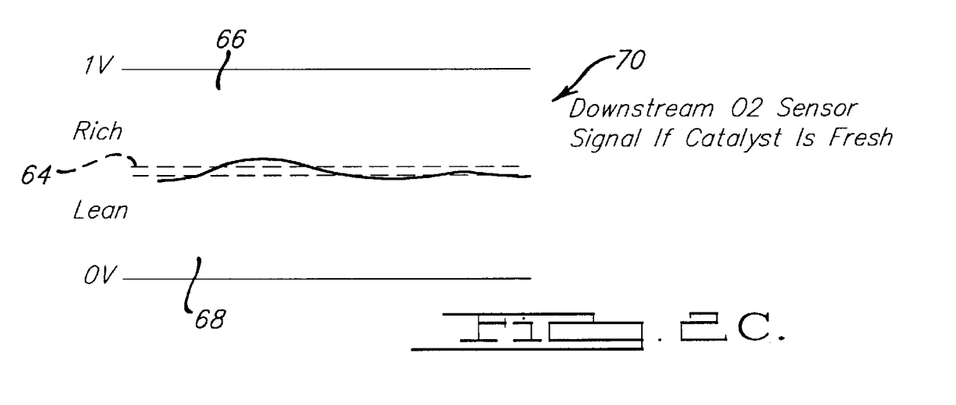
Figure 2D:
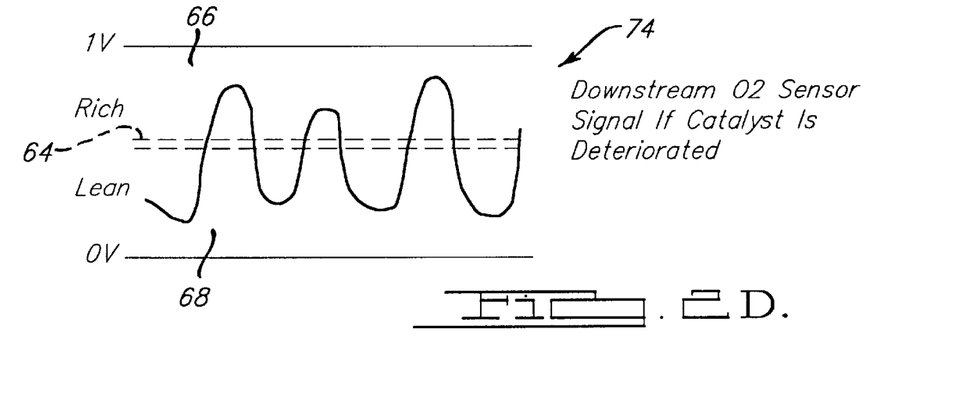

Referring to FIGS. 2C and 2D, a downstream oxygen sensor signal 70 from the downstream oxygen sensor 28 is shown. Similar to the upstream oxygen sensor signal 60, the oxygen sensor signal 70 represents a wave form varying between two predetermined voltages, such as zero (0) and one (1) volt in this example. In FIG. 2C, the oxygen sensor signal 70 is characteristic of a newer catalytic converter. The signal 70 of FIG. 2C can be directly compared to a downstream oxygen sensor signal 74 in FIG. 2D. In FIG. 2D, the downstream oxygen sensor signal 74 is illustrated when catalytic converter 22 is deteriorated. The oxygen sensor signal 74 has greater amplitude then the oxygen sensor signal 70 of the FIG. 2C.

Figure 3A:
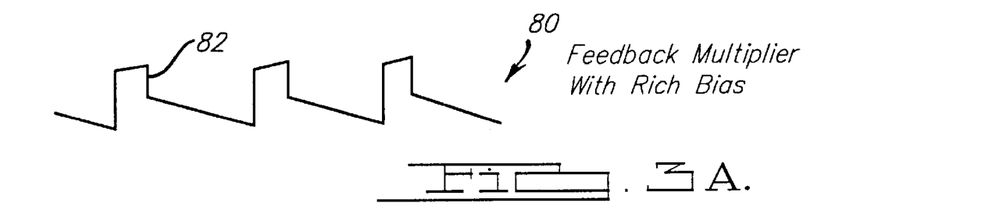
FIGS. 3A, 3B, 3C, and 3D are diagrams of signals representative of biased rich fuel for the emission control system of FIG. 1.

In FIG. 3A, a feedback multiplier signal 80 having a pulsewidth value 82 with a rich bias is shown. The multiplier signal 80, may be compared to the feedback multiplier signal 52 of FIG. 2A to illustrate the greater step changes in the rich direction. In this example, the fuel delivered by the fuel injector 20 is biased rich, although it could also be biased lean. The rich bias is achieved by creating greater step changes in the rich direction. Similarly, a lean bias could be achieved by using larger step changes in the lean direction.

Figure 3B:
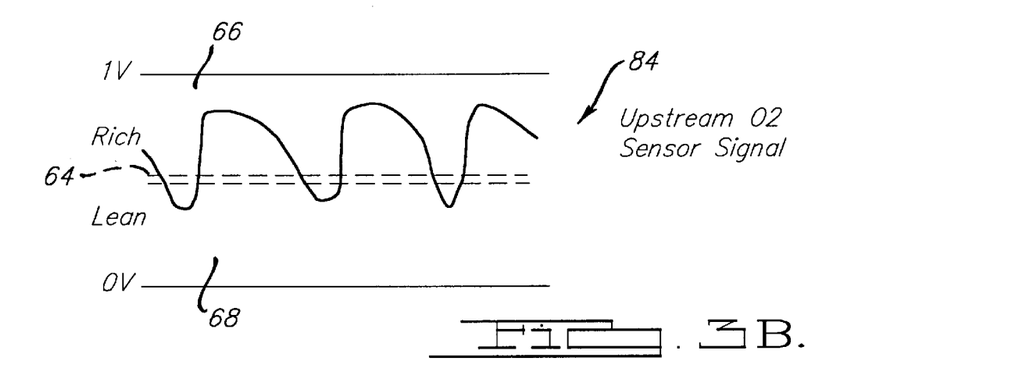
Figure 3C:
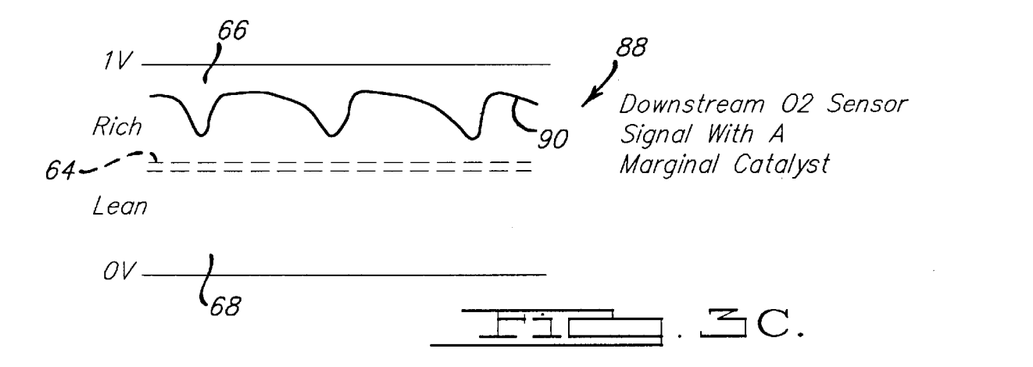
Figure 3D:
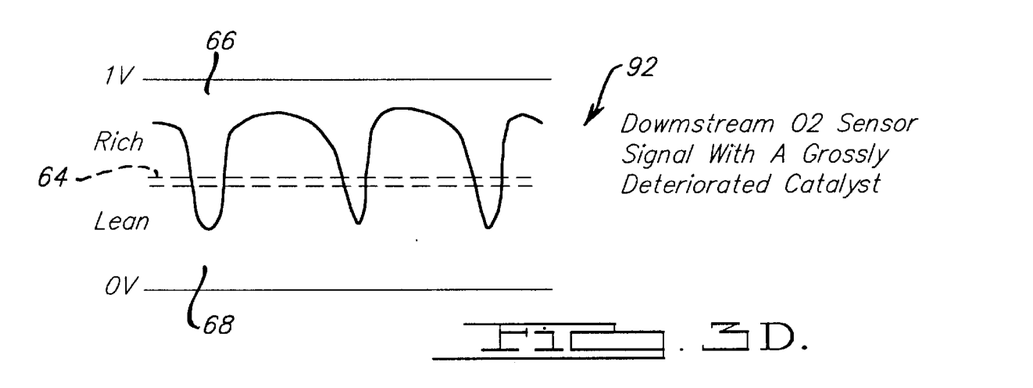

The effect of a rich bias on the upstream oxygen sensor signal 84 is illustrated in FIG. 3B. The signal 84, especially when compared to the signal 60 in FIG. 2B, indicates a larger period on the rich side. Similarly, FIGS. 3C and 3D illustrate the effect of a rich bias on the downstream oxygen sensor signal. FIG. 3C is an example of a downstream oxygen sensor signal 88 from a catalytic converter 22 that is marginally deteriorated. The oxygen sensor signal 88 has a greater average fuel/air ratio 90, and is more greatly attenuated as compared to FIG. 2D. Without the rich bias, the downstream oxygen sensor signal 88 of FIG. 3C would look like FIG. 2D. FIG. 3D is an example of the downstream oxygen sensor signal 92 with a grossly deteriorated catalytic converter 22. The distinctions are apparent between the oxygen sensor signal 92 and the oxygen sensor signals 88 and 74 of FIG. 3C and FIG. 2D, respectfully.

One particular concern with the emission control system 10 is that minor perturbations may cause an inaccurate indication of a fault. For example, fuel/air maldistribution between cylinders of the engine 12 may cause switching of the signal from the upstream oxygen sensor past an established or predetermined voltage threshold or switch points 64. By expanding the band of the voltage threshold or switch points 64, the switching of the signal from the upstream oxygen sensor 26 is not faulty. The result is a more regular, periodic feedback cycle.

Figure 4A:
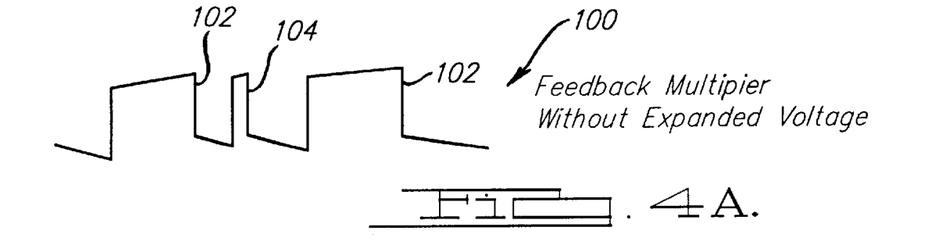
FIGS. 4A, 4B, 4C, and 4D are diagrams of signals representative of expanded switch points for the emission control system of FIG. 1.

Referring to FIGS. 4A, 4B, 4C, and 4D, an expanded voltage threshold or switch points 64 is illustrated. In FIG. 4A, an example of a feedback multiplier signal 100 having a pulsewidth value 102 with a minor perturbation is shown. The multiplier signal 100, especially when compared to the signal of FIG. 2A, contains minor perturbations illustrated at 104.

Figure 4B:
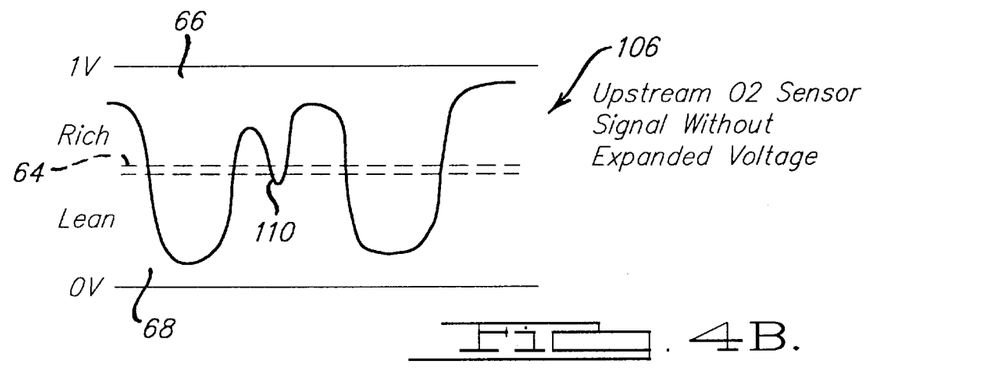

Referring to FIG. 4B, the cause of these perturbations 104 is an upstream oxygen sensor signal 106 as illustrated. The oxygen sensor signal 106 and feedback multiplier signal 100 are interactive but in this case, expanding the switch points 64 on the oxygen sensor signal 106 causes the feedback multiplier signal 114 not to respond as quickly. The oxygen sensor signal 106 contains perturbations 110 that are too small to affect the response of the downstream oxygen sensor 28, but may drop below the switch points 64, which will cause the upstream switch count to be incremented.

Figure 4C:
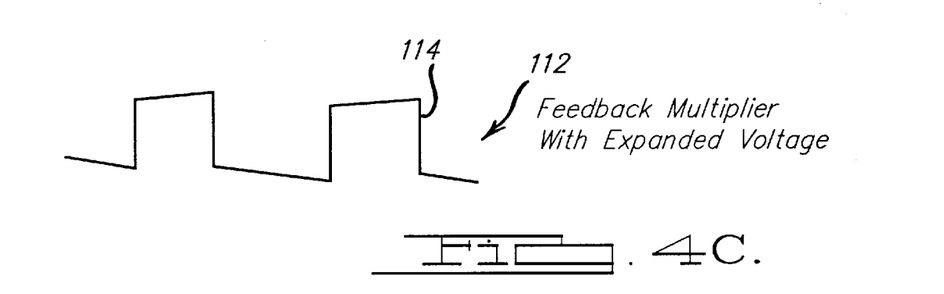

By expanding the voltage threshold or switch points 64, the upstream switch count is not corrupted by these minor perturbations and a more regular, periodic feedback cycle is provided by the feedback multiplier signal. In FIG. 4C, an example of a feedback multiplier signal 112 with expanded voltage is shown. The multiplier signal 112 is a periodic signal having a pulsewidth value 114.

Figure 4D:
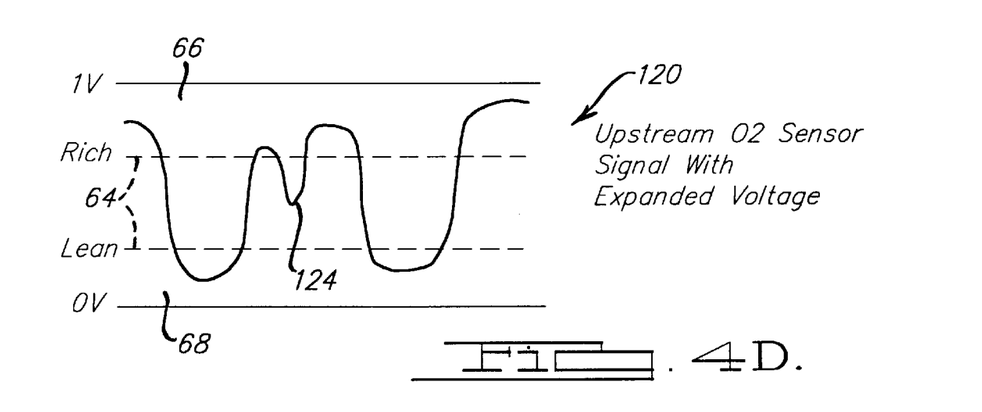

An example of expanding the voltage threshold on an upstream oxygen sensor signal 120 is shown in FIG. 4D. The resulting feedback multiplier 114 represents a more regular, periodic feedback cycle. Therefore, minor perturbations 124 are not included in the upstream switch count, resulting in the feedback multiplier signal 114 providing a more regular, periodic feedback cycle.

Figure 5:
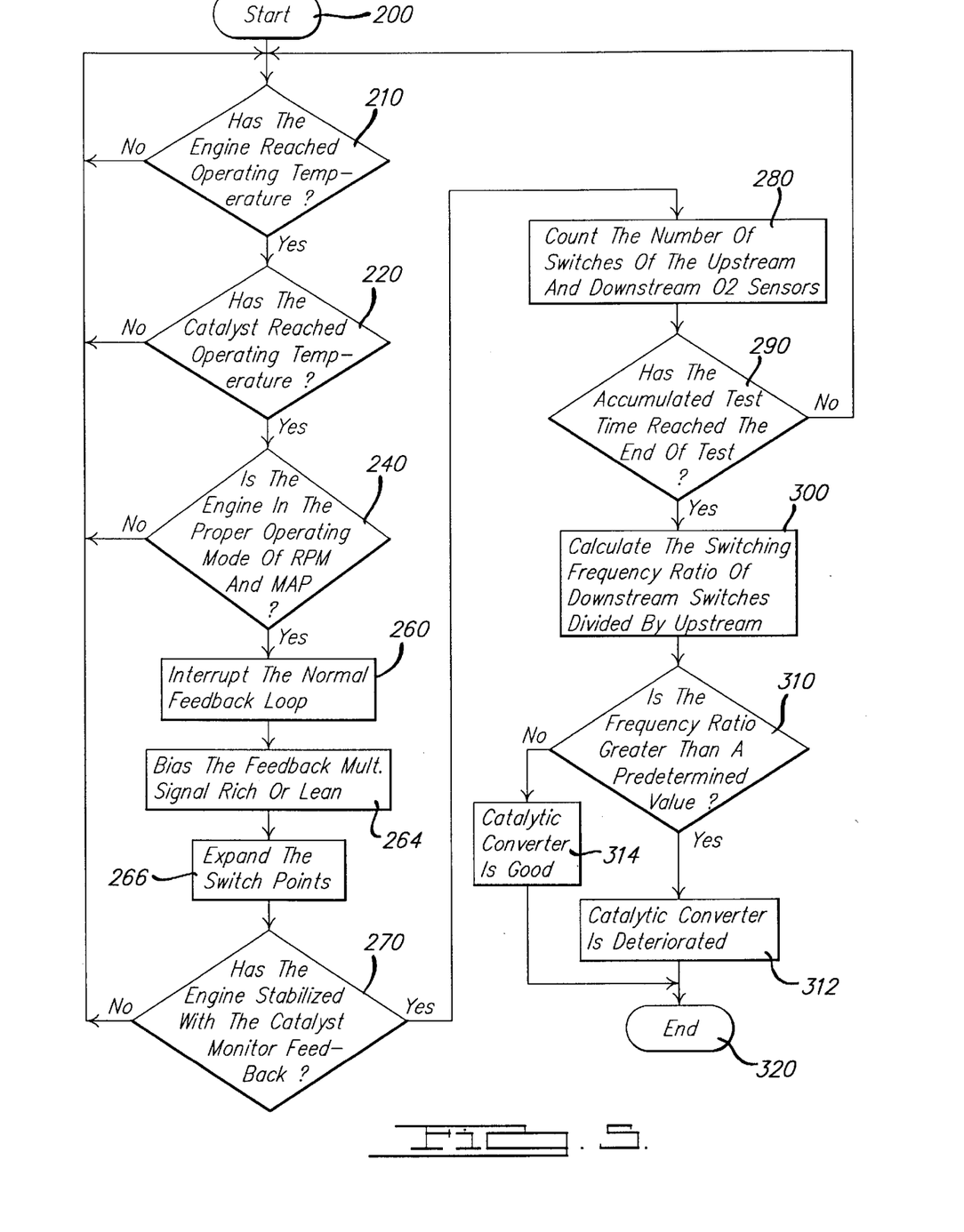
FIG. 5 is a flowchart of a method for monitoring the efficiency of a catalytic converter, according to the present invention, for the emission control system of FIG. 1.

Referring to FIG. 5, a method for monitoring the efficiency of the catalytic converter 22, according to the present invention, is illustrated. The methodology starts or begins in block 200, after being called for by the engine controller 14. The methodology advances to diamond 210 and determines if at least one preestablished condition is met for continuing the method. An example of a preestablished condition is if the engine 12 has reached a predetermined operating temperature such as 180° F. If this preestablished condition is not met, the methodology returns to diamond 210. If the preestablished condition is met, the methodology advances to diamond 220.

In diamond 220, the methodology determines whether another predetermined condition is met for continuing the method. An example of another preestablished condition is that the catalytic converter 22 is warmed up or reached a predetermined operating temperature such as 800° F. if the vehicle has been operated at vehicle speed greater than a predetermined speed such as twenty miles per hour (20 mph) for a predetermined time such as three (3) minutes. If this preestablished condition is not met, the methodology returns to diamond 210 previously described. If this preestablished condition is met, the methodology advances to diamond 240. In diamond 240, the methodology determines whether a further preestablished condition is met. An example of yet another preestablished condition is if the engine 12 is in a proper operating mode of engine speed (RPM) such as 1000<RPM<2000 and manifold absolute pressure (MAP) such as 300<MAP<500 torr. If the preestablished condition is not met, the methodology returns to diamond 210 previously described. If the preestablished condition is met, the methodology advances to block 260.

In block 260, the methodology interrupts the current fuel/air ratio feedback loop and the methodology advances to block 264. In block 264, the feedback multiplier signal 52 is biased either rich or lean, and the methodology advances to block 266. In block 266, the methodology expands the range of the switch points 64 separating a rich or lean condition, before advancing to diamond 270.

In diamond 270, the methodology determines whether the engine 12 has stabilized with the feedback multiplier signal 52 for this method. If the engine 12 has not stabilized, the methodology returns to diamond 210. If the engine 12 has stabilized, the methodology advances to block 280, and counts the number of times or switches of the oxygen sensor signal from the oxygen sensors 26 and 28 across the switch points 64, i.e. switches between a rich or lean condition. The number of switches is counted for the upstream oxygen sensor 26 and the downstream oxygen sensor 28, respectively.

After block 280, the methodology advances to diamond 290 and determines if the accumulated test time has reached a predetermined end of test condition such as 20 seconds. If the accumulated test time has not reached the end of test condition, the methodology returns to diamond 210 previously described. If the accumulated test time has reached the end of test condition, the methodology advances to block 300. In block 300, the methodology calculates the switching frequency ratio by taking the count of oxygen sensor switches from the downstream oxygen sensor 28 and dividing it by the count of oxygen sensor switches from the upstream oxygen sensor 26.

After block 300, the methodology advances to diamond 310 and determines whether the switching frequency ratio is greater than a predetermined value. An empirical relationship may be derived between the switching frequency ratio and catalytic converter 22 efficiency. For example, a switching frequency ratio of zero (0) indicates a new catalytic converter, and a switching frequency ratio approaching one (1) indicates a deteriorated catalytic converter. A predetermined value can than be selected as an indicator distinguishing between a good and a deteriorated catalytic converter 22. Therefore, if the switching frequency ratio is greater than the predetermined value, the methodology advances to block 312 and concludes that the catalytic converter 22 is deteriorated. The methodology may notify an operator of the vehicle through a malfunction indicator light on the instrument cluster (not shown but known in the art). The methodology then advances to block 320, where control is returned to the engine controller 14. If the switching frequency ratio is less than the predetermined value, the methodology advances to block 314 and concludes that the catalytic converter 22 is determined not to be deteriorated. The methodology then advances to block 320, previously described.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for monitoring efficiency of a catalytic converter in a motor vehicle, said method comprising the steps of:

operating an engine under a closed loop condition;

determining if at least one predetermined condition is met for monitoring the efficiency of the catalytic converter;

biasing a fuel feedback multiplier of an internal combustion engine of the motor vehicle to run rich or lean if the at least one predetermined condition is met;

determining whether the engine has stabilized with the fuel feedback multiplier;

counting a number of switches of a signal across a predetermined switch point from an upstream oxygen sensor positioned upstream of the catalytic converter if the engine has stabilized;

counting a number of switches of a signal across the predetermined switch point from a downstream oxygen sensor positioned downstream of the catalytic converter;

calculating a switching frequency ratio based on the count of the oxygen sensor switches from the upstream oxygen sensor and downstream oxygen sensor; and using the switching frequency ratio to establish the efficiency level of the catalytic converter.

2. A method as set forth in claim 1 wherein said step of calculating comprises calculating a switching frequency ratio by dividing the count of switches from the downstream oxygen sensor by the count of the switches from the upstream oxygen sensor.

3. A method as set forth in claim 1 including the step of comparing the switching frequency ratio to a predetermined threshold after said step of calculating.

4. A method as set forth in claim 3 wherein said step of using comprises concluding whether the catalytic converter is efficient based on the comparison of the switching frequency ratio to the predetermined threshold.

5. A method as set forth in claim 3 wherein the step of comparing the switching frequency ratio comprises determining if the switching frequency ratio is greater than a predetermined threshold and indicating that the catalytic converter is efficient if the switching frequency ratio is less than the predetermined threshold and indicating that the catalytic converter is not efficient if the switching frequency ratio is greater than the predetermined threshold.

6. A method as set forth in claim 5 wherein said step of indicating that the catalytic converter is not efficient comprises setting an indicator alerting a driver of the motor vehicle that the catalytic converter has failed an efficiency test.

7. A method as set forth in claim 1 wherein said step of determining if at least one predetermined condition is met comprises determining if the catalytic converter is warmed up and ending said method if the catalytic converter is not warmed up.

8. A method as set forth in claim 1 wherein said step of determining if at least one predetermined condition is met comprises determining if the engine is warmed up and ending said method if the engine is not warmed up.

9. A method as set forth in claim 1 including the step of expanding the switch point to a range separating a lean or rich condition.

10. A method for monitoring efficiency of a catalytic converter in a motor vehicle having an internal combustion engine, said method comprising the steps of:

operating the engine under a closed loop condition;

determining if at least one predetermined condition is met for monitoring the efficiency of the catalytic converter;

biasing the engine to run either rich or lean if the at least one predetermined condition is met for monitoring the efficiency of the catalytic converter;

expanding a range of a switch point separating a rich from a lean condition;

determining whether the engine has stabilized;

counting a number of upstream switches of a signal from a upstream oxygen sensor across the switch point if the engine has stabilized;

counting a number of downstream switches of a signal from a downstream oxygen sensor across the switch point;

calculating a switching frequency ratio by dividing the count of downstream switches by the count of upstream switches;

comparing the switching frequency ratio to a predetermined threshold; and concluding whether the catalytic converter is efficient based on the comparison of the switching frequency ratio to the predetermined threshold.

11. A method as set forth in claim 10 wherein said step of determining if at least one predetermined condition is met comprises determining if the catalytic converter is warmed up and ending said method if the catalytic converter is not warmed up.

12. A method as set forth in claim 10 wherein said step of determining if at least one predetermined condition is met comprises determining if the engine is warmed up and ending said method if the engine is not warmed up.

13. A method as set forth in claim 10 wherein said step of comparing the switching frequency ratio comprises:

determining if the switching frequency ratio is greater than a predetermined threshold;

indicating that the catalytic converter is efficient if the switching frequency ratio is less than the predetermined threshold; and indicating that the catalytic converter is not efficient if the switching frequency ratio is greater than the predetermined threshold.

14. A method as set forth in claim 13 wherein said step of indicating that the catalytic converter is not efficient includes setting an indicator alerting a driver of the motor vehicle that the catalytic converter has failed an efficiency test.

* * * * *

UNITED STATES PATENT AND TRADEMARK OFFICE
CERTIFICATE OF CORRECTION

PATENT NO  :     5,945,597
DATED      :     August 31, 1999
INVENTOR(S):     Poublon et al.

It is certified that error appears in the above-identified patent and that said Letters Patent is hereby corrected as shown below:

On the title page:
In the Assignee Section, please change "Chrysler Corpoation," to --Chrysler Corporation--.

Signed and Sealed this

Fourth Day of January, 2000

Attest:

Attesting Officer

*Acting Commissioner of Patents and Trademarks*